Feb. 24, 1931.    M. HOUDAILLE    1,794,294
SUSPENSION FOR VEHICLES
Filed May 17, 1928    4 Sheets-Sheet 1

M. Houdaille
INVENTOR

By Marks & Clerk
Attys.

Feb. 24, 1931.    M. HOUDAILLE    1,794,294
SUSPENSION FOR VEHICLES
Filed May 17, 1928    4 Sheets-Sheet 2

M. Houdaille
INVENTOR

By: Marks & Clark
ATTYS.

Feb. 24, 1931.                M. HOUDAILLE                1,794,294
                          SUSPENSION FOR VEHICLES
                           Filed May 17, 1928      4 Sheets-Sheet 3

Patented Feb. 24, 1931

1,794,294

UNITED STATES PATENT OFFICE

MAURICE HOUDAILLE, OF LEVALLOIS-PERRET, FRANCE

SUSPENSION FOR VEHICLES

Application filed May 17, 1928, Serial No. 278,501, and in France May 17, 1927.

The applicant has previously proposed a method for regulating the flexibility of a leaf spring, particularly in function of the curvature to which this spring is subjected. This method consists substantially in exerting on a movable or distortable portion of the spring a stress or a resistance which varies with the curvature of the spring.

Several devices for carrying out this method have also been proposed by the applicant, and the present invention concerns a new device of this nature, which can be more easily constructed and operates in a better manner than the preceding ones and which is applicable to all kinds of springs: leaf or coil springs.

This device is characterized by a two-arm lever pivoted on one of the two members between which the spring is interposed; by a link connecting one of these arms to the other of the said members, and by a second link connecting the other arm to a distortable portion of the spring, or to a lever acting on the spring, this whole structure being so arranged that, when the spring becomes distorted, the link connected thereto, exerts on the same a stress or a resistance which varies with the curvature of the spring.

The accompanying drawing illustrates, by way of example only, various forms of construction of the invention.

Figure 1:
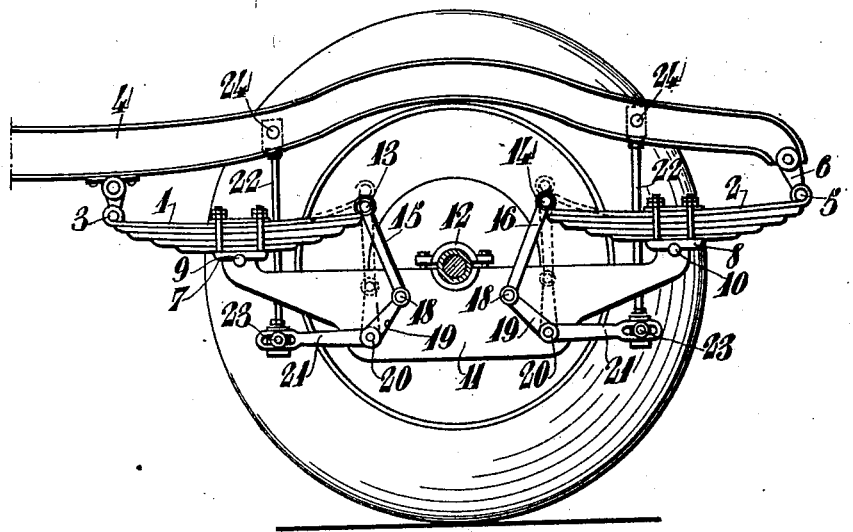
Figs. 1 to 3 are elevations and sections relating to the suspension of a motor vehicle on the live axle, with a thrust exerted by the live axle tube.

In the example illustrated in Fig. 1, the suspension comprises, instead of a single entire spring, two springs indicated at 1 and 2. The front spring 1 is pivoted at 3, by a double shackle 3, on the chassis, one of the longitudinal bearers of which is shown at 4. The rear spring 2 is pivoted at 5, by a double shackle 6, which connects it to the longitudinal bearer 4. These double shackles may, of course, be replaced by any other devices playing the same part.

On the other hand, each of the springs 1 and 2 is supported, in the usual manner, by flanges 7 and 8, by means of which these two springs are pivoted, at 9 and 10, on a support 11 integral with the live axle 12.

In the case of the front axle the support 11 would be secured on the axle, and the front double shackle would be replaced by a support secured on the chassis. The same may moreover be true for the rear suspension, according as the thrust is effected by the live axle tube, as illustrated in Fig. 1, or according as the thrust is obtained by the springs or by links.

At their inner ends, at 13 and 14, the springs 1 and 2 are connected, by double shackles 15 and 16, or by any other system playing the same part, to the branch 19 of a double lever pivoted at 20 on the support 11; the other arm 21 is connected to the longitudinal bearer 4 by a link 22, pivoted in any suitable manner, and for instance by a ball joint, at 22, on the arm 21, and at 24 on the longitudinal bearer 4.

The angle of both arms 19 and 21 of the lever will be so chosen that the pivotal movement of this lever can give to the springs the required variable flexibilities for the lowering and rebounding of the chassis.

In fact, it will be understood that any relative displacement of the live axle 12 and of the chassis 4, displacement which has for effect to cause the levers 21—19 to pivot, will cause the inner ends 13 and 14 of the springs 1 and 2 to occupy successive positions, imposing to the springs 1 and 2 different flexures for one and the same relative displacement of the chassis and of the axle, according to the position at this moment of the axle relatively to the chassis.

In the example of Fig. 1, the angle between the arms 19 and 21 has been so chosen that when the axle or the live axle move towards the chassis, the vertical displacement of the inner portion of the spring for one and the same relative displacement of the axle and of the chassis, considerably diminishes for altering in direction from the moment the link 15 comes in alignment with the branch 19 of the lever, as shown in dotted lines. This difference of vertical displacement for one and the same angular displacement of the lever 19—21, suitably computed, automatically produces the progressivity in the flexibility of the system. This flexibility is greater than the normal flexibility of the spring, in the zone comprised between the position shown in full lines and that shown in dotted lines. For this latter position, the flexibility of the system is equal to that of the spring. Beyond this position, the flexibility diminishes. In this example, the flexibility diminishes therefore at the same time as the distance between the axle and the chassis.

Figure 2:
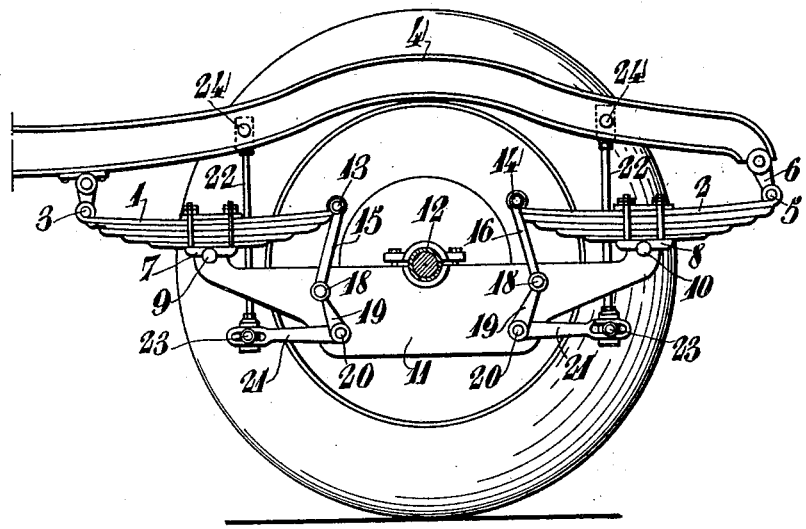
Figure 3:
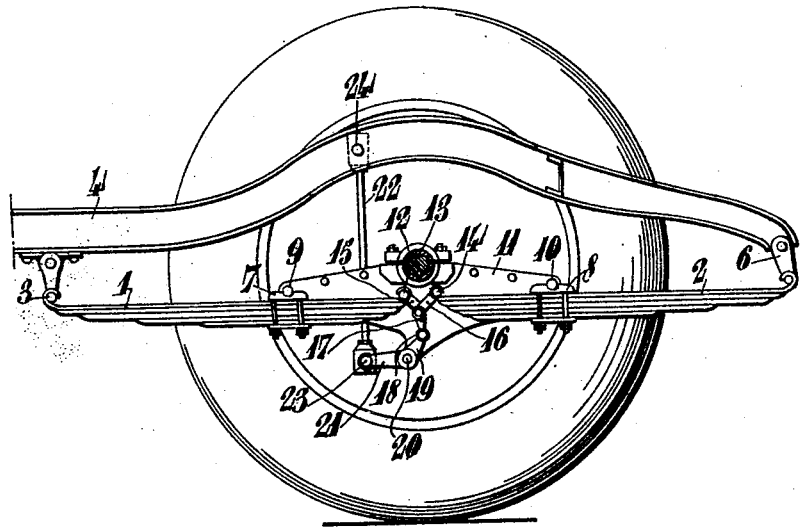

The reverse may also be realized, in this sense that the apparent flexibility of the spring is smaller than its initial flexibility, as shown in Fig. 2. In this case, use is made of a spring with a much greater initial flexibility; this, moreover, does not offer as many advantages as the device of Fig. 1. Finally, a single lever 19—21 can be used, as shown in Fig. 3, this lever being connected by the link 17 to the double shackles 15 and 16.

It is very important to note that the position of each of the pivoting points of the system will be conveniently adjustable, this allowing to modify at will the law of variation of the flexibility. In particular, the position of the pivoting axis of the links 22 on the arms 21 of the levers will be rendered easily adjustable, as shown in Fig. 1. Experience has shown that a very slight modification of the location of this joint produced very notable modifications of the law of flexibility.

Instead of adjusting the position of the pivoting axis, the angle of the two levers 19 and 21 may be rendered adjustable as well as the length of the links 22, this allowing to obtain a range of flexibilities suited to the whole of the system.

Figure 4:
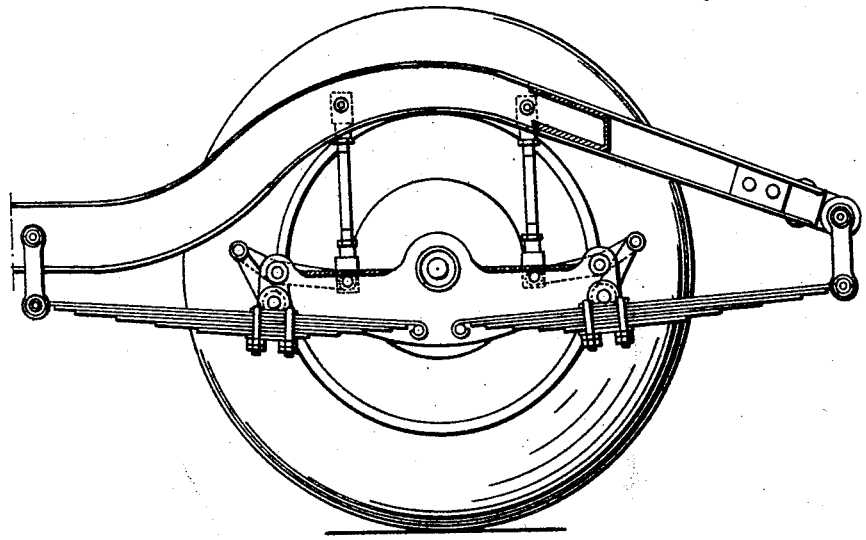
Fig. 4 is a similar view relating to a modification.

It is obvious that, instead of acting on the inner end of the springs, these ends could be directly pivoted on the support 11, the regulating device then acting of the pivoting flanges 7 and 8 of the springs. Such a construction is illustrated for instance in Fig. 4. It obviously necessitates the use of two connecting rods or links, if it is not desired to have unequal arms 21.

Figure 5:
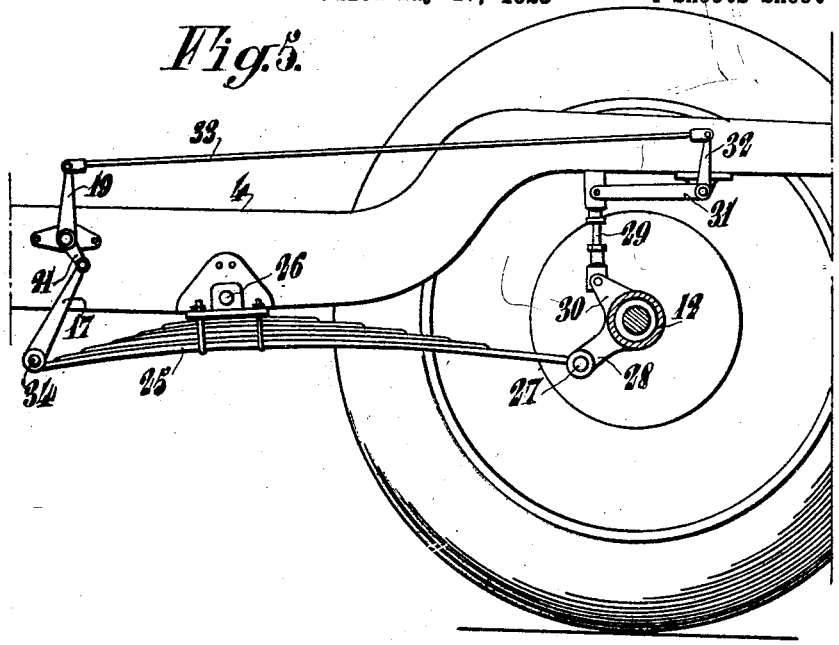
Fig. 5 is a view of another modification, utilizing a cantilever spring.

The arrangement in accordance with the invention may also be employed in case a single spring is used, as shown at 25 in Fig. 5. In this case, the spring is pivoted at 26 on the longitudinal bearer 4; at one of its ends, the said spring is pivoted, at 27, on a lever 28 rigid with the live axle 12 (or with the axle). A link connects a second lever 30, also rigid with the live axle 12, to a bell crank 31—32, which is itself connected by a link 33 to the two-arm lever 19—21 constituting the member regulating the flexibility of the spring, the arm 21 being connected by the link 17 to the front end 34 of the spring 25.

Figure 6:
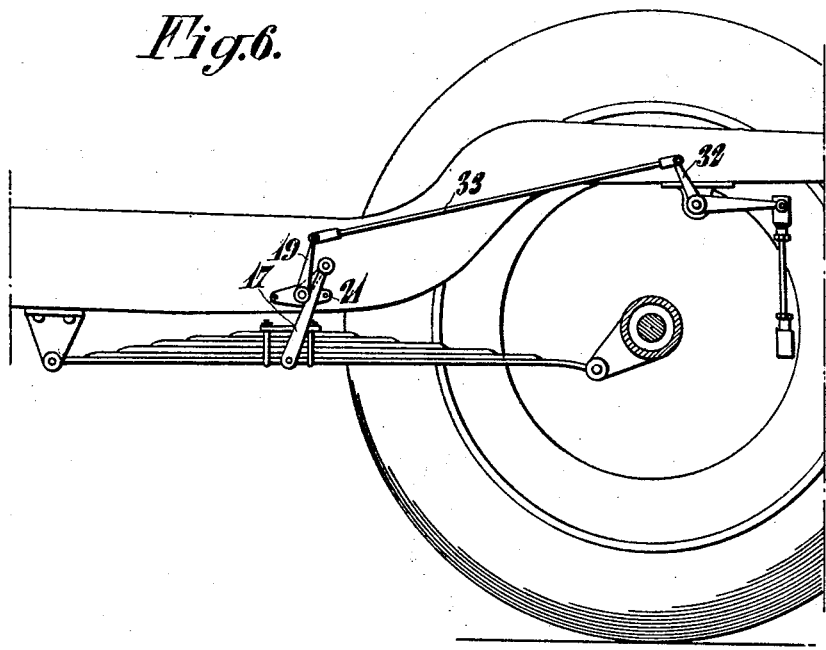
Fig. 6 is a modification of Fig. 5.

The operation is obviously the same as in the preceding example, and this arrangement is capable of a modification, illustrated in Fig. 6, in which the member for regulating the flexibility acts on the middle portion of the spring instead of acting at its end. The modification of Fig. 6 differentiates from the example of Fig. 5 in the same way as the modification of Fig. 4 differentiates from the form of construction of Fig. 3.

Figure 7:
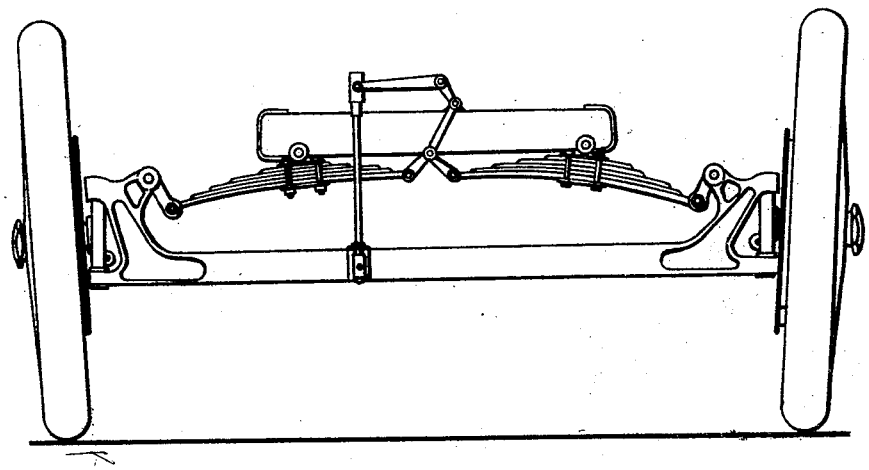
Fig. 7 shows a suspension by transverse springs in accordance with the invention.
Figure 8:
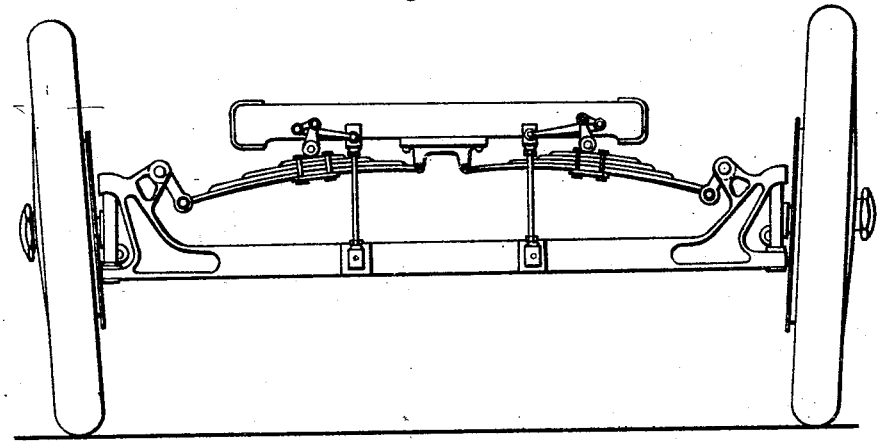
Fig. 8 is a modification of the example illustrated in Fig. 7.

The arrangement in accordance with the invention also applies to transverse springs, according to the two main modifications which have just been set forth for each realization, and as illustrated in Figs. 7 and 8. In Fig. 7, as in Figs. 3 and 5, the member for regulating the flexibility acts on the inner ends of the springs, whilst, in the example of Fig. 8, as in the case of Figs. 4 and 6, the regulation member acts on the middle portion of the springs.

It is finally to be mentioned that the device forming the subject-matter of the invention is applicable to all kinds of suspensions by any springs, leaf or like springs, and is capable of receiving a large number of modification which all remain included within the scope of the invention. Thus, a leaf spring can, for the application of the invention, be replaced by a coil spring combined with a lever acting on the said coil spring.

What I claim as my invention and desire to secure by Letters Patent is:

1. In a suspension means between two members movable relatively to each other, companion springs interposed between said members, means connecting the medial portions, of the springs to one of said members, means connecting certain of the ends of the springs to the other member, two levers pivoted to the first mentioned member and connected with the second mentioned member, and means connecting said levers with other of the ends of the said springs.

2. In a suspension means between two members movable relatively to each other comprising a spring arranged between the members and connected to the two said members, the combination of a two-armed lever pivoted to one of said members, a link connection between one of the lever arms and the other of said members, and means for varying the point of connection between the link and said lever arm.

3. In a suspension means between two members movable relatively to each other comprising a spring arranged between said members and connected to the two said members, the combination of a two-armed lever pivoted to one of said members, and having one arm disposed substantially perpendicular to the direction of movement between said members, a link kinematically connecting said arm to the other of said members, and means for varying the point of connection between the link and said lever arm.

In testimony whereof I have signed my name to this specification.

MAURICE HOUDAILLE.